May 17, 1966   N. O. SHORT ET AL   3,251,358
COOKING UTENSIL
Filed May 25, 1964
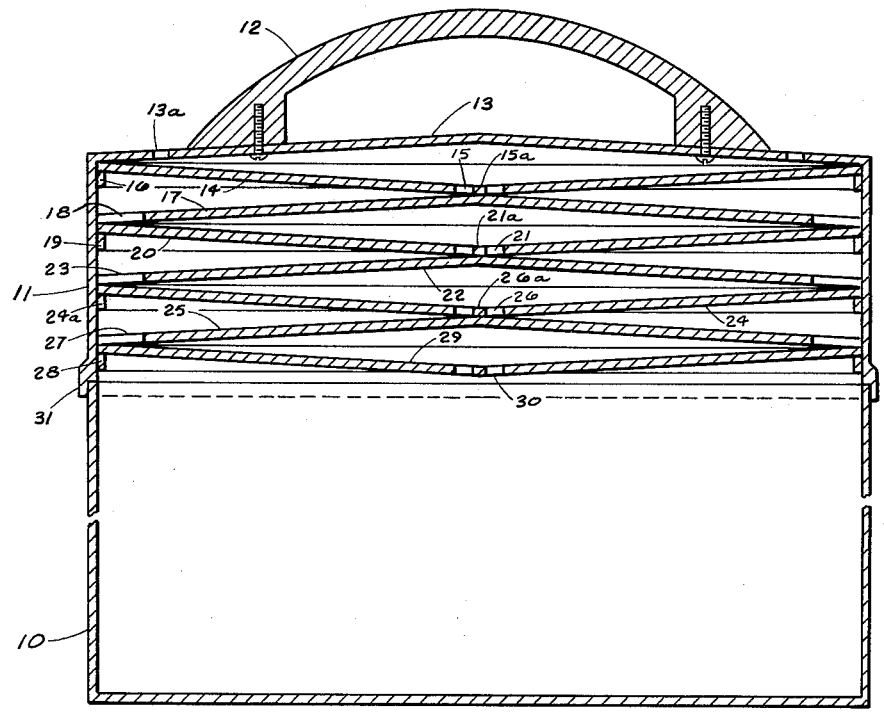
FIG._1
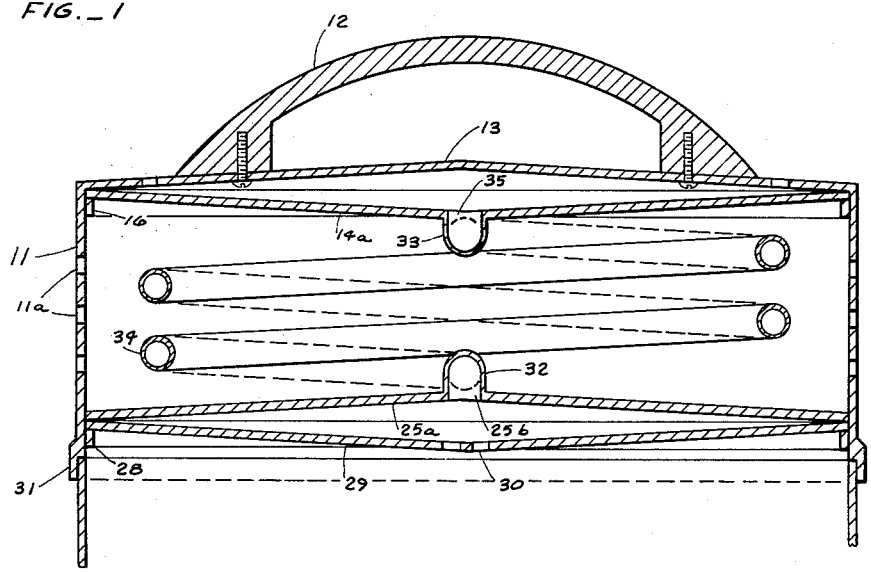
FIG._2
INVENTORS
NATHAN O. SHORT
BY JAMES R. SHORT
Allen and Chirurgy

United States Patent Office 3,251,358
Patented May 17, 1966

3,251,358
COOKING UTENSIL
Nathan O. Short, 11597 6th Ave., Hanford, Calif., and James R. Short, 927 Live Oak Drive, Santa Clara, Calif.
Filed May 25, 1964, Ser. No. 369,885
1 Claim. (Cl. 126—381)

An object of this invention is to provide an improved cooking utensil constructed so that essentially no moisture is lost therefrom during the cooking process.

Another object of this invention is to provide an improved cooking utensil that is constructed so that it may be economically and efficiently manufactured.

Still another object of this invention is to provide an improved cooking utensil that is provided with a moisture-condensing structure in the cover thereof in which the vapor driven off of the liquid, food or other articles heated in the utensil is condensed and returned to the inside of the utensil occupied by the liquid, food or other articles being heated.

Still another object of this invention is to provide an improved cooking utensil cover structure in which there are positioned a plurality of interleaved baffle members which function as a condensing unit for condensing the moisture vaporized from the liquid, food or other articles being heated in the utensil so that the condensed vapor may be returned to the liquid, food or other articles being heated.

Still another object of this invention is to provide an improved cooking utensil with a cover having a moisture-condensing baffle arrangement therein which may be readily disassembled for cleaning, if desired.

Other and further objects of this invention will be apparent to those skilled in the art to which it relates from the following specification, claim and drawing in which, briefly:

FIG. 1 is a vertical sectional view of a cooking utensil provided with a cover in which there are positioned in interleaved fashion a plurality of moisture-condensing baffle members; and FIG. 2 is a vertical sectional view taken through the cover of a modified form of moisture-condensing arrangement constructed in accordance with this invention.

Referring to the drawing in detail, reference numeral 10 designates a cooking utensil which may be of metal, such as aluminum, stainless steel, or the like, or it may be of glass or similar material, that is adapted to be positioned over an electric heating unit or gas burner so that food and liquids placed therein may be heated and processed for consumption. The vessel 10 is provided with a cover 11 having a handle 12 of heat-insulating material attached to the top thereof so that the cover may be conveniently lifted and placed on the vessel 10 or removed therefrom. The top 13 of the cover is provided with one or more vent holes 13a to prevent excessive pressure from building up in the cover structure.

A dished baffle member 14 is positioned under the cover and fits into the inside of the cover so that the peripheral portions of this baffle member engage the inside walls of the cover. If desired, the peripheral portions of the baffle member 14 may be beaded downward as indicated at 16, or the part 16 may be made as a separate ring which may extend downward a sufficient distance to engage the edge portion of the next baffle 17 and thus function as a spacer. Baffle member 14, as well as the other baffle members 17, 20, 22, 24, 25 and 29, are all made of relatively light gauge metal such as aluminum or stainless steel, and they are all of such size as to fit relatively snugly into the cover 11. Baffle members 20, 24 and 29 are identical to baffle member 14 and they are also provided with retaining rings 19, 24 and 28, respectively, such as ring 16 of member 14. Baffle members 14, 20, 24 and 29 are provided with holes 15, 21, 26 and 30, respectively, located substantially in the central areas thereof in the lowest parts thereof so that condensed liquids flow down the upper surfaces of these baffle members to these holes. Rib members 15a, 21a, 26a and 30a are provided in these central depressed areas of the baffle members 14, 20, 24 and 29, respectively, between the respective holes. Rib members 15a, 21a and 26a engage the apexes of the baffle members 17, 22 and 25, respectively, to prevent the apex portions of these baffle members from extending up into the holes of baffle members 14, 20 and 24, respectively, and restricting or closing these holes. Baffle members 17, 22 and 25, on the other hand, are provided with one or more holes around the periphery thereof at 18, 23 and 27.

The dished baffle members 14, 17, 20, 22, 24, 25 and 29 are interleaved, as shown in FIG. 1, and provide a series of cavities therebetween which are connected by the holes 15, 18, 21, 23, 26 and 27. Thus, the water vapor enters the cavity between baffle members 25 and 29 through the holes 30 and spreads out in this cavity. Some of the water vapor condenses on the walls of this cavity and the remainder leaves it through the peripheral holes 27 formed in baffle member 25, thereby entering the annular cavity formed between baffle members 24 and 25. The central part of which communicates with the next cavity through holes 26 formed in baffle member 24. Some of the water vapor entering the cavity between baffle members 24 and 25 will, of course, contact the inner surface of the cover 11, as well as the surfaces of the baffle members which are cool enough to condense the vapor with the result that this vapor is condensed. The condensed liquid flows down on baffle member 29 through the peripheral holes 27 and drops into the vessel 10 through holes 30. One the other hand, as the cooking process proceeds, more and more of the water vapor will find its way upward between the respective baffle members through the holes provided in these baffle members, so that some of the water vapor may contact the lower surface of the cover 13 and be condensed thereon. However, if excessive pressure should develop through the production of an excessive amount of water vapor, some of the excess will leave the cover through the holes 13a formed through the top thereof. The liquid condensed on the under surface of the cover 13 flows down to the baffle 14 and through holes 15 onto baffle member 17. Inasmuch as the upper surface of this baffle member in inclined towards the circumference thereof, the liquid flows down it through holes 18 onto baffle member 20 and along the upper surface of this latter member to holes 21 through which it flows onto baffle member 22 to holes 23, thence onto baffle member 24 to holes 26 through which it flows onto baffle member 25. Member 25 is provided with holes 27 through which the condensate flows onto baffle member 29 and from this member it flows into the vessel 10 through holes 30.

Another embodiment of this invention is shown in FIG. 2, and in this case the helical tubular coil 34, which may be made of metal such as copper, aluminum, stainless steel or the like, is substituted for several of the intermediate baffle members. The lower end 32 of this coil is attached by soldering or the like to the hole 25b of baffle member 25a, and the upper end 33 of this coil is attached by soldering or the like to hole 35 of the baffle member 14a. The side walls of the cover 11 are also, in this modification, provided with holes 11a through which air circulates through the cover and around the helical tube 34 to cool the outer surface of this tube and facilitate condensation of the water vapor therein. The bottom baffle member 29 is the same as the corresponding baffle member shown in FIG. 1, and it is also provided with a supporting ring 28 which may be made integral with the peripheral portions of the baffle member. This ring engages the inner walls of the cover and in sufficiently resilient so that the friction therebetween holds the baffle members in place in the cover.

The bottom part 31 of the cover is of a larger diameter than the top of the vessel 10 so that this part extends downward over the outside of the vessel 10 for a short distance to prevent water vapor escaping from the vessel.

While we have disclosed preferred embodiments of this invention in the foregoing specification, it is not desired to limit the invention to the exact details described and illustrated, except insofar as those details are defined by the appended claim.

What we claim is:

A cooking utensil comprising a cooking vessel, a cover for said vessel, and means in said cover for condensing the liquid vapors given off by the articles or liquids during the heating thereof in said cooking vessel, said condensing means comprising a plurality of baffle members fitted into said cover, said baffle members being dished and stacked in said cover so that vapor-receiving cavities are formed between adjacent ones thereof, alternate ones of said baffle members being downwardly dished and provided with holes at the depressed central parts thereof, and the others of said baffle members being upwardly dished and provided holes in their peripheral portions, the cavities between said baffle members being connected by several radially extending serpentine paths passing through said holes whereby the liquid vapor passing upward through said cavities passes through said radially extending serpentine paths and the condensate formed from these vapors flows downward along said paths into said cooking vessel.

References Cited by the Examiner

UNITED STATES PATENTS

| | | | |
|---|---|---|---|
| 1,086,986 | 2/1914 | Blodgett. | |
| 1,408,692 | 3/1922 | Curtis | 126—381 |
| 1,468,908 | 9/1923 | Krafft | 126—381 |
| 1,822,257 | 9/1931 | Wentorf | 126—382 |

FOREIGN PATENTS

| | | |
|---|---|---|
| 821,998 | 9/1937 | France. |

THERON E. CONDON, *Primary Examiner.*

R. H. SCHWARTZ, *Assistant Examiner.*